US008423910B2

(12) United States Patent  (10) Patent No.: US 8,423,910 B2
Shepherd  (45) Date of Patent: Apr. 16, 2013

(54) KNOWLEDGE GATHERING METHODS AND SYSTEMS FOR TRANSFORMING PRODUCT DESCRIPTIONS INTO PROCESS NETWORKS

(75) Inventor: Michael David Shepherd, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 946 days.

(21) Appl. No.: 12/248,474

(22) Filed: Oct. 9, 2008

(65) Prior Publication Data

US 2010/0095246 A1  Apr. 15, 2010

(51) Int. Cl.
  *G06F 3/048*  (2006.01)
  *G06F 19/00*  (2011.01)
  *G06F 17/00*  (2006.01)

(52) U.S. Cl.
  USPC .............................. 715/835; 715/274; 700/97

(58) Field of Classification Search .................. 715/274, 715/835, 967; 700/97
  See application file for complete search history.

(56) References Cited

U.S. PATENT DOCUMENTS

| | | | | |
|---|---|---|---|---|
| 6,616,702 | B1 * | 9/2003 | Tonkin ............................ | 715/209 |
| 7,406,357 | B2 * | 7/2008 | Ocke et al. ........................ | 700/97 |
| 2003/0090708 | A1 * | 5/2003 | Dennison et al. ............. | 358/1.15 |
| 2003/0140315 | A1 * | 7/2003 | Blumberg et al. ............. | 715/527 |
| 2004/0120012 | A1 * | 6/2004 | Leurs et al. ................... | 358/1.18 |
| 2006/0114490 | A1 | 6/2006 | Rolleston ...................... | 358/1.14 |
| 2009/0279125 | A1 * | 11/2009 | Liu et al. ....................... | 358/1.15 |
| 2010/0277758 | A1 * | 11/2010 | Reichhart ..................... | 358/1.15 |

OTHER PUBLICATIONS

David Blatner Real Word QuarkXPress 7 for Macintosh and Windows Peachpit Press Oct. 12, 2007 21 pages.*
Michael Miller Complete Idiot's Guide to Microsoft Works Suite 2000 Penguin 2000 pp. 165-175.*
Gretchen Peck "Retail Online Integration" Mar. 2004 4 pages.*
IBM Visual Job Ticketing 2002 4 pages.*
Moody's Investor Service Mimeo Quick Reference Guide Mar. 9, 2001 4 pages.*

* cited by examiner

*Primary Examiner* — Adam M. Queler
*Assistant Examiner* — Andrea Long
(74) *Attorney, Agent, or Firm* — Kermit D. Lopez; Luis M. Ortiz; Kevin Soules (57) ABSTRACT

Methods and systems for automated, local product classification through knowledge engineering aided by visual representation of the product may be combined with some targeted queries. A library of product descriptions, particularly, print product descriptions, are visualized and custom document visualizations can be created and added. Products in the library can be searched and managed via a query mechanism that filters on values of the product characteristics. Knowledge encoded in the visual representation is automatically mapped into the classification system's internal representation of the print products which is thus made common throughout the shop and may be made common across shops. The characteristics as described by the product visualization, in combination with ranges and other parameter constraints, can be subsequently mapped into the internal abstraction of product type representation of a conversation system for transforming product descriptions into process networks.

20 Claims, 8 Drawing Sheets

KNOWLEDGE GATHERING METHODS AND SYSTEMS FOR TRANSFORMING PRODUCT DESCRIPTIONS INTO PROCESS NETWORKS

TECHNICAL FIELD

The presently disclosed embodiments generally relate to product descriptions and also relate to process workflows. More particularly, the present disclosed embodiments relate to knowledge gathering systems and methods for transforming product descriptions, particularly product descriptions of print products, such as books, into process networks.

BACKGROUND

In workflow automation systems, the description of a product is in a vocabulary specific to the nature of the product, whereas the description of the steps required to create the product are in a vocabulary or several vocabularies specific to the processes involved in creating the various components of the product. Translation of the Product Description into a detailed set of processing instruction is often done manually and can be time consuming. Manual translation depends heavily on individual expertise, thereby creating a scarce resource, e.g., an expert whose job it is to translate Product Descriptions into processing instruction. For low-margin, quick turn-around business such as that conducted by print shops, manual tasks requiring extensive human expertise are significant factors in the cost of creating the end product.

A JDF product description conversion system can transform JDF Product Intent (a product description) into a Process Network that can be used to manufacture the desired product. A JDF Product Intent ticket defines a product description of the final product to be produced by the production shop. The product description consists of intent parameters of product characteristics (binding, covers, finished size, etc.) and references to artwork content such as PDLs (PDF files, postscript files, etc.) and supporting data files (images, fonts, profiles, etc.) The product description conversion system uses a classification system to determine the product type of the intent ticket provided. An ontology of product type definitions is used in conjunction with an inferencing system to calculate the product type.

BRIEF SUMMARY

According to one aspect, an automated system of knowledge gathering for transforming product descriptions into process networks is provided. The automated system can be configured to select for product visualization a product description from a library of product descriptions. The product descriptions can be print product descriptions. The automated system can be further configured to use a product visualizer to display the product defined by the selected product description and can gather additional product information further defining the visualized product from a graphical user interface. The automated system can be yet further configured to map the visualized product description and gathered additional product information into a product type abstraction of a classification system for transforming product descriptions into process networks.

According to another aspect, a method of knowledge gathering for transforming product descriptions into process networks is provided. A library of product descriptions, particularly, print product descriptions, can be provided. A product description can be selected from the library for product visualization. A product visualizer can be used to display the product defined by the selected product description. Additional product information further defining the visualized product can be gathered. The visualized product description and gathered additional product information can be mapped into a product type abstraction of a classification system for transforming a product description into a process network.

According to yet another aspect, there is provided a computer program product comprising: a computer-usable data carrier storing instructions that, when executed by a computer, cause the computer to perform a method comprising a method of knowledge gathering for transforming product descriptions into process networks. The method can comprising providing a library of product descriptions, such as print product descriptions; selecting for product visualization a product description from said library of product descriptions; using a product visualizer to display the product defined by the selected product description; gathering additional product information further defining the visualized product; and mapping the visualized product description and gathered additional product information into a product type abstraction of a classification system.

BRIEF DESCRIPTION OF THE DRAWINGS

The accompanying figures, in which like reference numerals refer to identical or functionally similar elements throughout the separate views and which are incorporated in and form a part of the specification, further illustrate the embodiment, together with the background, brief summary, and detailed description, serve to explain the principles of the illustrative embodiment.

DETAILED DESCRIPTION

Definitions:

Product Description Transformation Process—The automatic conversion of a formal product description, such as JDF Intent, into a Process Network (workflow) that can be used to manufacture the desired product.

JDF—The Job Definition Format. A formal language that describes both print products and the processes required for creating print products. Specifically JDF describes products and processes used in print shops.

JDF Intent—Synonymous with JDF Product Intent.

JDF Process—A set of processing instructions sufficient to describe the details of a particular process step.

Examples of JDF Process Nodes are: DigitalPrinting, Imposition, Stitching, . . . (a set of processing instructions).

JDF Product Intent—A formal description of a print product such as a Book, Business Card or Brochure. (more generally, a Product Description).

Product Description—A print product described using a formal unambiguous vocabulary. An example of a product description vocabulary is the JDF Product Node.

Processing Instructions—Instructions sufficient to execute a particular process. An example of processing instructions is the Process Node construct in JDF.

Process Network—A set of processing instructions that when executed in the order specified by the process network result is a product. A process network is synonymous with a workflow.

Workflow—A Process Network (as defined above).

Network (workflow) that can be used to manufacture the desired product.

For the purposes of discussion hereinafter, a "print shop" refers to a grouping of printing resources. The print shop may be a freestanding entity such as a commercial printer or may be part of a corporation or other entity. A "print product" is any product or logical unit of work produced by a print job. For example, a print product can be a booklet, a brochure or a single document. A "print job" refers to work that is to be completed for a customer so as to provide the print product. For example, a request to make 10 copies of a book is a print job. Similarly, a request to make 100 copies of a single document is a print job.

Insofar as a print shop, the print shop has a vocabulary to describe classifications in the form of print product classes. A product class is the aspect of print shop vocabulary (ontology) used to classify a print product, the print shop vocabulary being the specific language used in the print shop for communicating between product and process. A given print shop's vocabulary to describe product classes need not be formalized since the concepts herein provide for the vocabulary to be changed and shop vocabularies can vary among different print shops. The set of product classes in the vocabulary constitutes the system of classification. The system of classification is defined primarily by the desired final product, such as for example a "Booklet", but can vary depending on the form of manufacture of the final product, such as for example a "BookletWithOfflineFinishing" or a "BookletWithInlineFinishing". The system of classification is not restricted to any particular form. For example, the product classes may all be distinct or exist in a hierarchical structure. Classifications can be in a form other than a product class.

The presently disclosed embodiments provide an approach to knowledge engineering for automated product classification using visual representation of the product. The approach provides a lightweight method for gathering knowledge of product definitions, particular print product definitions.

Features described in this application can be used to provide a knowledge gathering approach that alleviates the variation of differing terminology and print product descriptions among print shops and reduces the time consuming and expensive knowledge engineering effort required for gathering, modeling, and representing a shop's print products.

Features described in this application can be used to construct various knowledge gathering methods and systems for transforming product descriptions to process networks which permit knowledge engineering, knowledge representation, and logical definition of print product types and other product types to be greatly simplified. For example, features described in this application can be used to construct methods for automated, local print product classification through knowledge engineering aided by visual representation of the product combined with some targeted queries (particularly regarding the range of particular characteristics that apply to the provided terms). A library of product descriptions are visualized and custom document visualizations can be created and added. Print products in the library can be searched and managed via a simple query mechanism that filters on values of the product characteristics. Knowledge encoded in the visual representation is automatically mapped into the classification system's internal representation of the print products which then may be shared across shops. The characteristics as described by the product visualization, in combination with ranges and other parameter constraints, can be subsequently mapped into the internal abstraction of product type representation of a conversation system for transforming product descriptions into process networks.

Examples of such product description conversion systems and methods can be found in. United States Patent Publication No. U.S. Pat. No. 7,406,357 B2, entitled "A Method For Transforming A Product Description Into A Process Network That Specifies How To Create The Product", issued on Jul. 29, 2008, the disclosure of which is incorporated herein by reference in its entirety.

Figure 1:
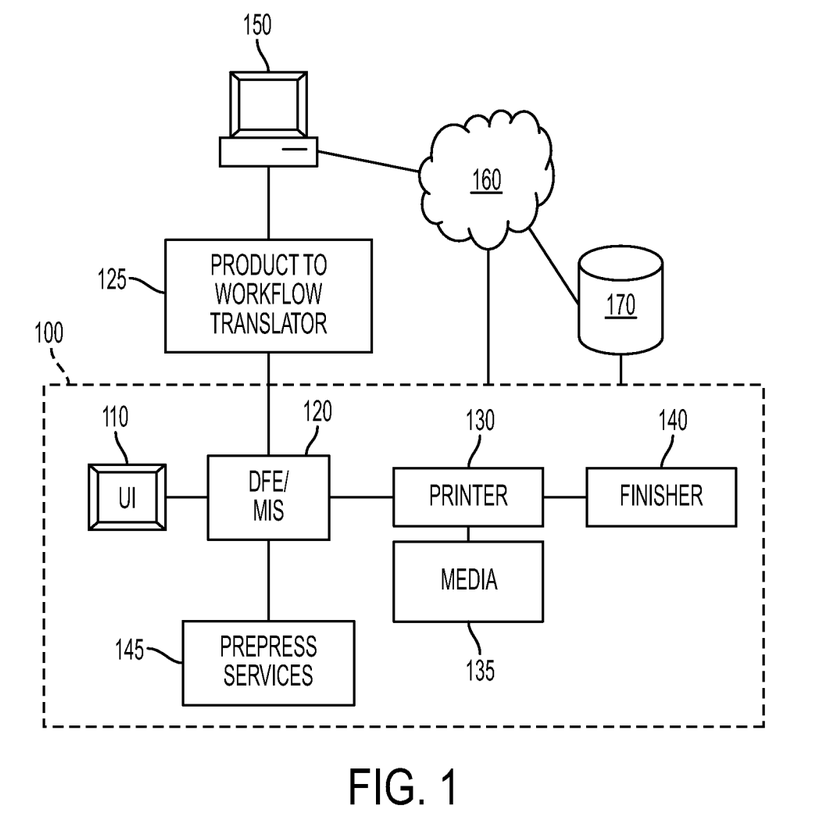
FIG. 1 illustrates components of an exemplary workflow automation system which enables creation, modification and execution of workflows.

Referring to FIG. 1 of the accompanying drawings, components of a printing system 100 including a workflow automation system that can be utilized in accordance with carrying out the embodiments is illustrated. A typical printing system includes a user interface 110, a digital front end (DFE) 120, and a print engine 130. In this particular example, the workflow automation system can be implemented on the DFE or MIS 120 in conjunction with user interface 110 or work station 150. The DFE or MIS 120 includes access to modules 125 to assist with product to workflow translation, typically embodied in software, and also enables image processing and control function. Various prepress services 145 may optionally be invoked from the MIS or other print job controller. The print engine 130 has access to media 135 of various size and cost. A finisher 140 operates after a job is printed by the print engine 130 to manage arrangement of the print job, which can include sorting, cutting and stitching functions. A user can access and operate the printing system 100 using the user interface 110 or via the workstation 150. The workstation 150 can communicate with a printing system 100 utilizing a communications network 160. A user profile, work product for printing, media library and print job parameters can be stored in a database 170 or memory also accessible by the workstation 150 or printing system 100 via the network 160, or which can be directly accessed via the printing system 100. A printing system 100 can be improved in accordance with features of the embodiments to include a product to workflow translator module 125 as shown in FIG. 1.

Figure 2:
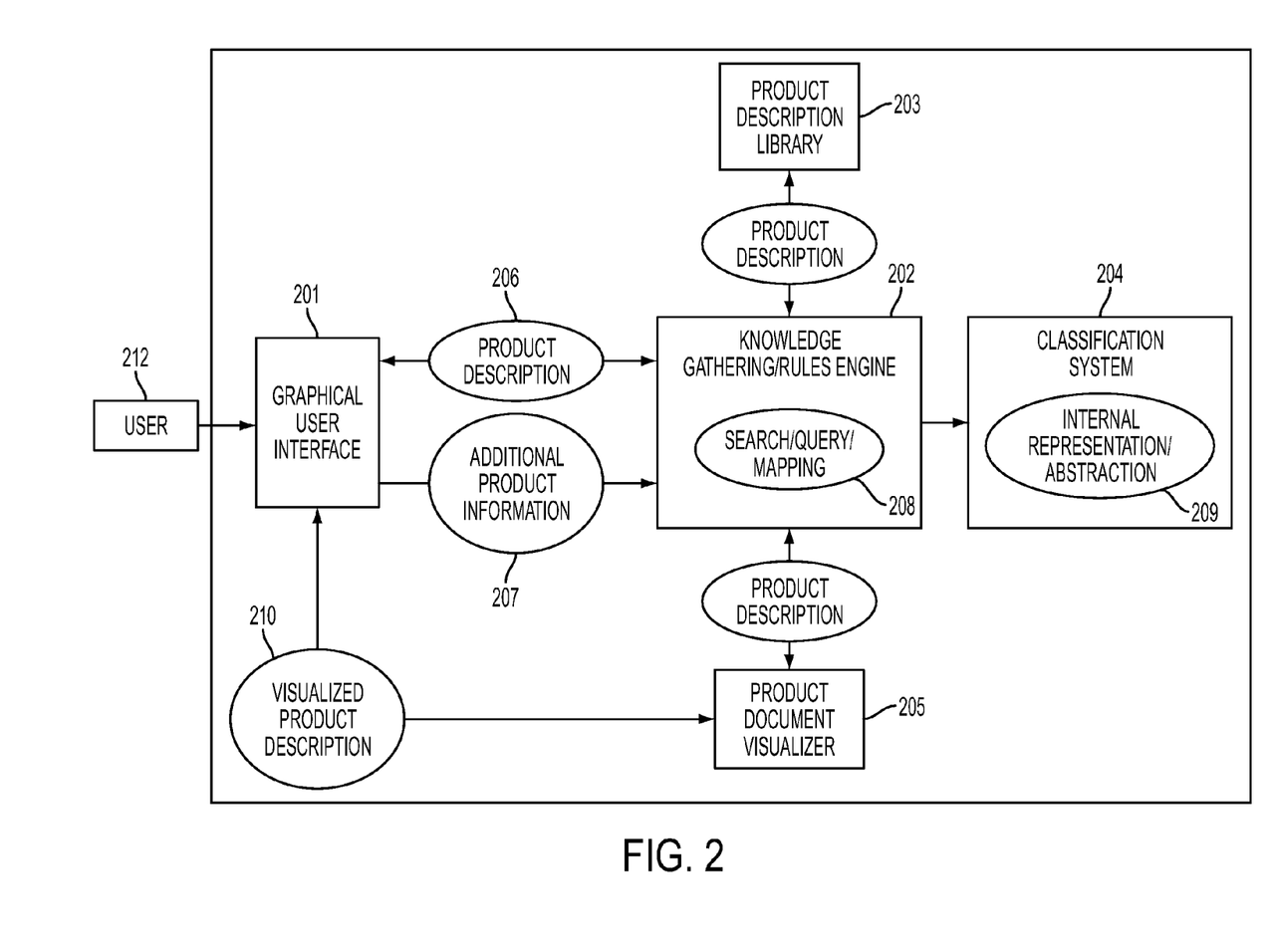
FIG. 2 illustrates a block diagram illustrating modules and operations thereof for carrying out knowledge gathering methods for transforming product descriptions to process networks in accordance with features of the embodiments.

FIG. 2 illustrates a block diagram illustrating modules and operations thereof for carrying out knowledge gathering methods for transforming product descriptions to process networks in accordance with features of the embodiments. These modules may be software, hardware or a combination of both. The software may include java code or other types of code. These modules can be run locally on a workflow automation system, as in the case of the workflow automation system of FIG. 1, or run from a remote location via a network coupled to the workflow automation system. These modules can be integrated in a single module if needed. Those skilled in the art would know that there are multiple modes of implementing such modules. The module(s) can be implemented as computer program product comprising: a computer-usable data carrier storing instructions that, when executed by a computer, cause the computer to perform a methods of knowledge gathering for transforming product descriptions into process networks according to features of embodiments described in this application.

Figure 3:
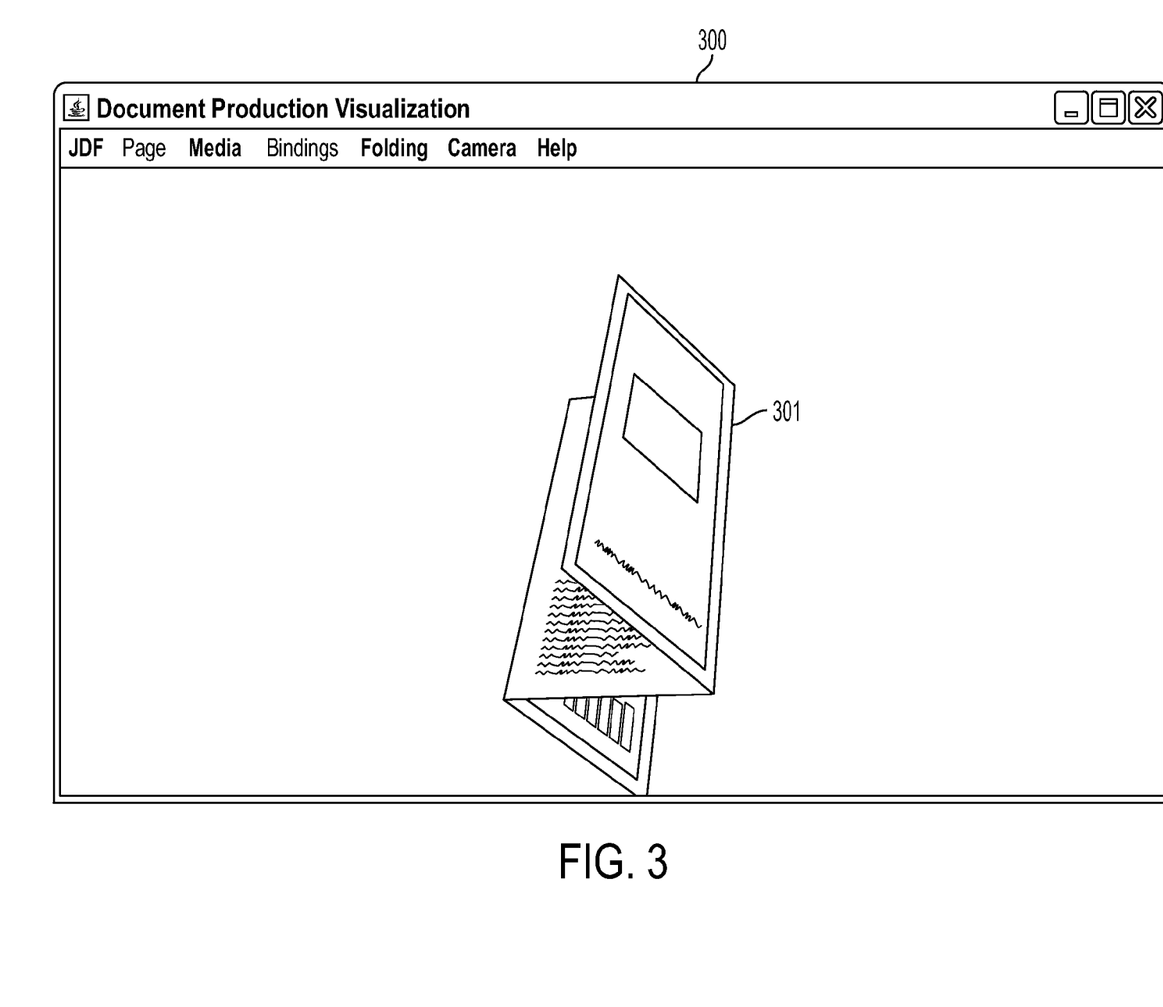
FIG. 3 illustrates a computer screen sheet of a sample product visualization.

As indicated in FIG. 2, a graphical user interface 201 enables a user configuring the print shop's workflow system to access a product description library 203 and a Product Document Visualizer (PDV) 205. The user 212 may be for example a shop configuration expert. The print product descriptions 206 in the library consist of characteristics that describe the print product type. Product Document Visualizer 205 is a module which is configured to render and display product descriptions as documents on a screen of the graphical user interface 201 in 2D or 3D, an embodiment of which can be found in United States Patent Application Publication No. 20060114490, entitled "System and Method for Document Production Visualization", and dated Jun. 1, 2006, the disclosure of which is incorporated herein by reference in its entirety. By way of example, FIG. 3 illustrates an exemplary screen shot 300 of a Document Product Visualization in which the displayed product is a tri-fold fold product 301. The graphical user interface, Product Document Visualizer, and library are operably interconnected to enable the User to create their own document visualizations via the graphical user interface 201 and, if necessary, export them as product descriptions to the library. A Knowledge gathering/rules engine 202 is configured to enable the user 212 to search and manage, via the graphical user interface 201, subsets of the print products in the library. The engine 202 uses a simple query mechanism that queries a knowledge-base using a knowledge-based query language so as to filter on values of the product characteristics. If necessary, a user 212 can iterate through visualizations of the product descriptions.

Knowledge gathering/rules engine 202 is also configured to gather additional product information from the graphical user interface. Engine 202 can collect one or more terms applied by user through the graphical user interface for a depicted print product. The knowledge gathering engine is also configured to gather additional information from the user by providing generality queries (or questions) to the graphical user interface and receiving additional information provided by the user in response via the graphical user interface. The knowledge gathering engine is configured to include a mechanism for acquiring from the user, via the graphical user interface, the range of particular characteristic that apply to the provided terms. For instance, a product type may be defined with a range of total reader pages or a range of media sizes. Lower and upper bounds for the product characteristic may be specified by the user. These bounds can be provided through the graphical user interface in different ways. For example, the system can be configured to provide via the graphical user interface a direct query via dialog box, and/or enhancement of the Product Document visualizer (PDV) to represent multiple values for product characteristics, and/or enhancement of the PDV to represent two or more products as the lowest and upper-most bounds for the product. Additional features can be implemented in the PDV application for expressing multiple valued attributes.

Knowledge gathering/rules engine 202 is further adapted to map characteristics as described by the product visualization, in combination with ranges and other parameter constraints gathered from the user through the graphical user interface, into an internal abstraction of product type representation of a classification system which is used for classifying product descriptions in the process of transforming product descriptions into product networks.

Figure 8A:
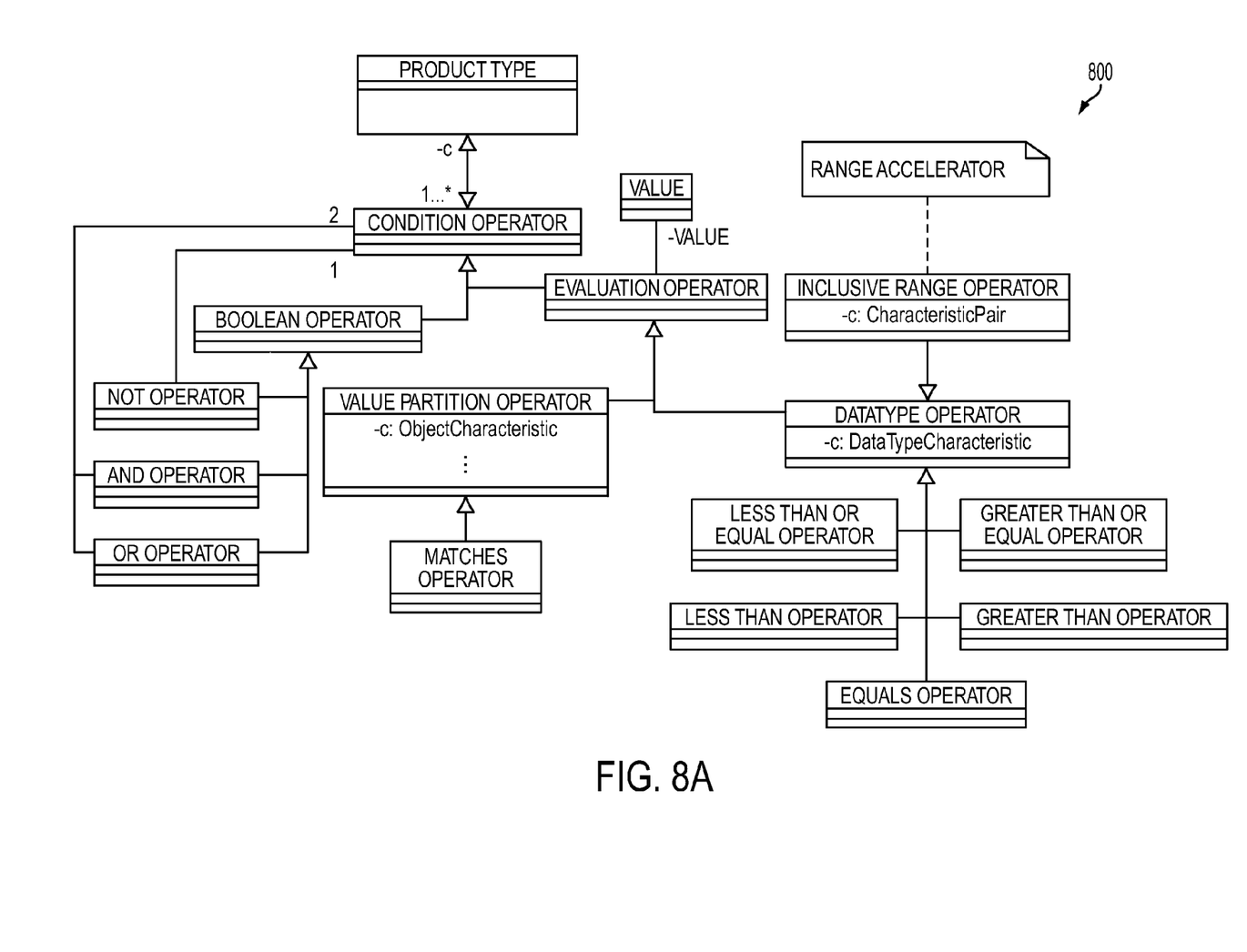
FIGS. 8A and 8B illustrate a sample Product Type Description Abstraction which provides the system's representation of the key elements for the Product Description.
Figure 8B:
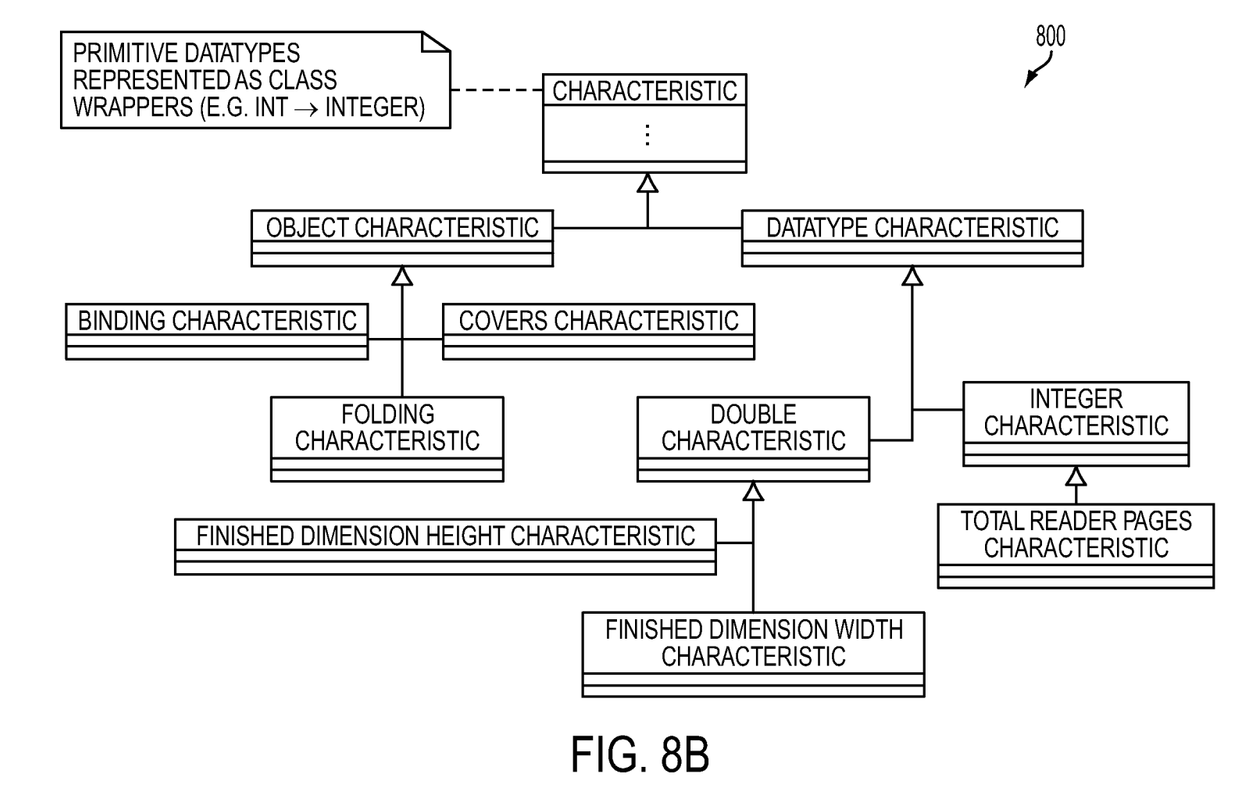

An exemplary Product Type Abstraction is illustrated in FIGS. 8A and 8B. The Product Type Abstraction comprehends a small set of print product characteristics and description logics that provide for subsequent automatic classification of product descriptions (e.g. JDF Product Intents) in the product description transformation process. The knowledge gathering methods and systems described herein according to features of the embodiments do not depend on using the particular abstraction model represented in FIGS. 8A and 8B, but could use other representations of descriptions for various other types of classification systems and the characteristics which provide the vocabulary to define the classes therein.

The knowledge gathering engine 202 is configured to gather characteristics of the product description, which include document binding, folding, covers, as well as, product dimensions and total reader pages, from the visualization application and maps these into the abstraction (see FIGS. 8A and 8B). Subsequent to the abstraction, the internal representation of the classification can be shared among a plurality of shops, which in this particular example would be a plurality of print shops. The abstraction is reified into rules or other forms of executable definitions in which the product description to process network transformation method performs product type classification on newly submitted product descriptions (e.g. JDF Product Intents). Details of the process of classifying product descriptions and transforming product descriptions into product networks can be found in the aforementioned U.S. Pat. No. 7,406,357.

Figure 4:
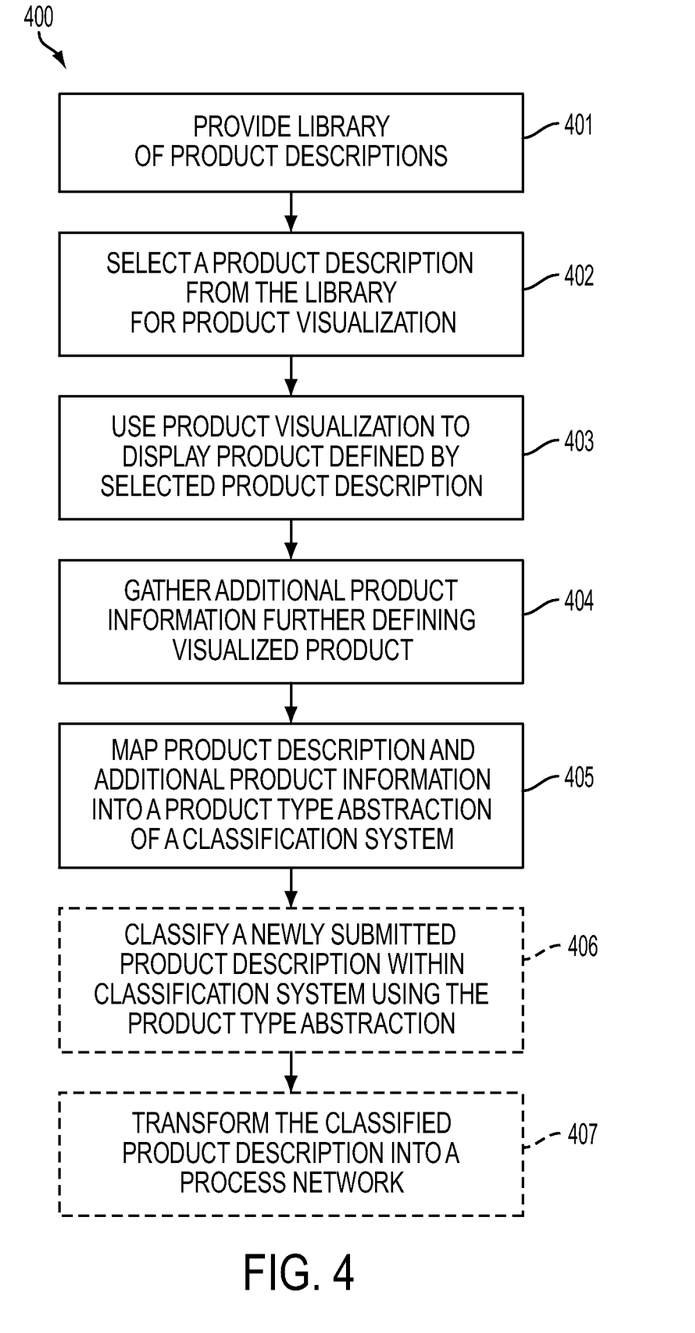
FIG. 4 illustrates a flow diagram outlining process steps which are performed in knowledge gathering methods for transforming product descriptions to process networks in accordance with features of the embodiments.

Referring now to FIG. 4, this illustrates a flow diagram outlining process steps which are performed in knowledge gathering methods for transforming product descriptions to process networks in accordance with features of the embodiments. Initially, a library of product descriptions is provided, as indicated by step s401. A product description is selected from the library for product visualization (s402). Product visualization is used to display the product defined by the selected product description (s403). Additional product information is gathered for further defining visualized product (s404). The product description and additional product information is mapped into a product type abstraction of a classification system (s405).

Features described in this application can be used to construct various knowledge gathering methods and systems which can be used in processes of transforming product descriptions to process networks. For example, subsequent to the product description and additional product information being mapped into the product type abstraction of the classification system, the product description or a newly submitted product description can be classified within the classification system s406. The classified product description can then be transformed into a process network s407. Examples of transforming classified product descriptions into a process network are disclosed in the United States Patent Publication No. U.S. Pat. No. 7,406,357. Process steps s406 and s407 are exemplary steps which need not form part of the knowledge gathering methods and systems of the embodiments and can be examples provided for the purpose of explanation of the embodiments.

One stage of product description to process network transformation is to classify the product description into a print product type (brochure, flyer, pamphlet, etc.). A known product description transformation system contains an ontology of print products with static definitions deployed commonly to all print shops. The knowledge engineering effort required for gathering, modeling, and representing a shop's print products has heretheretho been time consuming and expensive. The result of the knowledge gathering methods and systems according to features of the embodiments is that the ontology of print product definitions is configurable in the print shop for the print shop. This is a useful result because the terminology and description of print products differ between print shops.

These knowledge gathering methods and systems result in users being able to configure print product definitions in the print shop such that print shops may define product types specific to their business model and offerings. This avoids the need for print shops to describe the print product using the terminology and definition constructs of the deployed knowledge-based classification system, would require a user configuring the system to have semantically deep knowledge of the classification system itself. The knowledge gathering methods and system described in this application greatly simplifies the knowledge engineering, knowledge representation, and logical definition of print product types.

Figure 5:
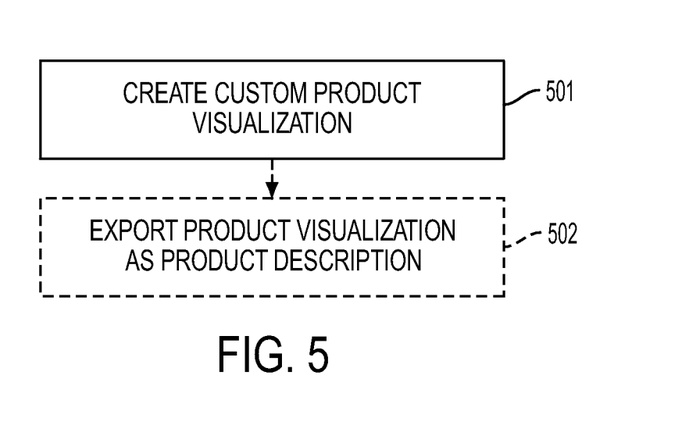
FIGS. 5 to 7 illustrate exemplary process steps which may be adopted in the knowledge gathering method for transforming product descriptions to process networks shown in FIG. 4 in accordance with features of the embodiments.

Referring to FIG. 5, there is shown a flow-diagram outlining process steps for creating product descriptions in the library and which can be used to supplement process 400 of FIG. 4. As indicted in FIG. 5, one or more custom product visualizations can be created (s501). If desired, the custom product visualization can be exported as a product description into the library (s502).

Figure 6:
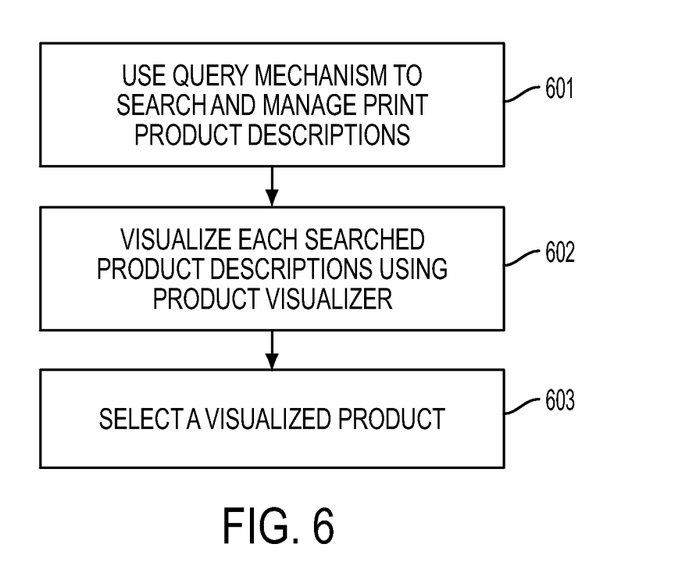

Referring to FIG. 6, there is shown a flow-diagram illustrating in more detail the process step of selecting a product description shown in FIG. 4 according to one example. In order to select a product description, query mechanisms can be used to search and manage product descriptions s601. Each searched product description can be visualized using product visualization (s602). The searched visualized product can be subsequently selected (s603).

Figure 7:
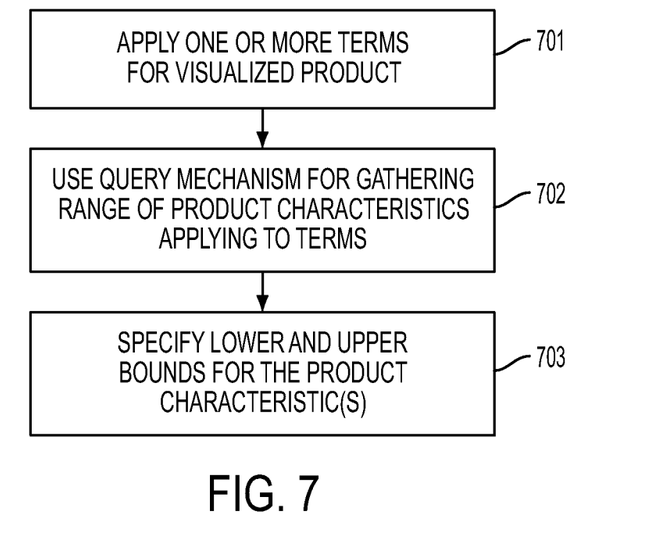

Referring to FIG. 7, there is shown a flow-diagram illustrating in more detail the process step of gathering additional product information for further defining the visualized product (s404 of FIG. 4) according to one example. One or more terms for the selected visualized product are applied (s701). A query mechanism is used for gathering range of product characteristics applying to the applied term or terms (s702). Lower and upper bounds for the product characteristic(s) are specified (s703). Process steps s701 to s703 are just some examples of gathering additional product information (s404). Furthermore, not all of process steps s701 to s703 need to be implemented to perform the step of gathering additional product information (s404). For example, s701 could be implemented without s702 & s703.

Knowledge gathering methods for transforming print product descriptions to process networks will now be described by way of examples with reference to FIGS. 1-8. In each example, the method is implemented using a workflow automation system having features of FIGS. 1 and 2. The resulting mapped internal abstraction can be used by the workflow automation system to manufacture a product as per optional example steps s406 and s407.

EXAMPLES

Print Shop A uses the term "flyer" to describe a single sheet tri-fold product with finished dimension of 3.67"×8.5" and "brochure" to describe a 5-12 page saddle stitched product.

Print Shop B uses the term "brochure" to describe the single sheet tri-fold product and "pamphlet" to describe a 5-48 page stitched product with a finished dimension of 4.25"×11".

For both shops, the term "brochure" is defined differently than the default static product definitions deployed commonly to both print shops A and B. The static product definitions are deployed in the product classification system.

Print Shop A uses the knowledge gathering method and system for classifying the "flyer" product. A user 212, which may be a shop configuration expert, configuring the print shop opens a tri-fold product for visualization. This is achieved by the user selecting, via graphical user interface 201, the tri-fold product description 206 from the product library 203 (s402). The product document visualizer 205 renders and displays the tri-fold product description on the screen of the graphical user interface (s403). An example of a visualized tri-fold product 301 is shown in FIG. 3. Additional information about the tri-fold product description is gathered by the user applying the term "flyer" to the visualized tri-fold product (s404 & s701). Upon confirmation, an instance of the product type abstraction is created in the Product Classification System 204 for use in transforming a tri-fold fold product description to a process network. This is achieved by the knowledge gathering/rules engine 202 mapping the gathered additional information and tri-fold product description 206 into the product type abstraction 209 of the product classification system 204 (s405). Similarly, user 212 chooses another product description 206 (s402) termed "brochure" from the library, this time a 10 page saddle stitched product. The product document visualizer 205 renders on the user screen a 10-page document as imposed 2-up and folded down the center with two stitches in the center fold (s403). Additional information about the visualized product is gathered by the user providing a range of 5-12 for the total number of reader pages in response to a query generated by the engine 202 (s404, s702 & s703). Another instance of the product type abstraction is mapped to the Classification System 204 (s405).

Print Shop B uses the knowledge gathering method for classifying the "brochure". A user 212 at Print Shop B opens a tri-fold product for visualization by selecting, via graphical user interface 201, the tri-fold product description 206 from the product library 203 (s402). Additional information about the tri-fold product description 206 is gathered by the user applying the term "brochure" to the visualized tri-fold product (s404 & s701). An instance of the product type abstraction is mapped into the Classification System 204 (s405) for use in transforming a tri-fold fold product description to a process network.

For the "pamphlet", the user 212 creates a new custom product visualization (s501) which starts with 2 sheets of 8.5×11 plain paper. A length-wise center fold is added, and then stitching along the fold. The result is visualized showing the document folding along the center axis and stitched along the center fold (s403). Subsequently, additional information about the visualized product is gathered (s404). To this end, user 212 applies the term "pamphlet" (s701) and a range of 5-48 is given for the total number of reader pages in response to a query (s702). An instance of the product type abstraction is mapped into the Classification System 204 (s405) for use in transforming the pamphlet product description to a process network.

The knowledge gathering system and methods of this application leverage knowledge representation technologies such as rule-bases and semantic representations (taxonomies, equivalence class definitions, etc.) in conjunction with print product type visualization (via the Document Product Visualization technology).

The knowledge gathering methods and system described in this application can be implemented to enable simpler product definition configuration in the print shop such that print shops may define product types specific to their business model and offerings. These knowledge gathering methods and systems make transformation of the product descriptions into process networks easier among a plurality of print shops.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The claims can encompass embodiments in hardware, software, or a combination thereof. The word "printer" as used herein encompasses any apparatus, such as a digital copier, bookmaking machine, facsimile machine, multifunction machine, etc. which performs a print outputting function for any purpose.

What is claimed is:

1. An automated system of knowledge gathering for transforming product descriptions into process networks; the system comprising
    a data-processing apparatus;
    a non-transitory tangible computer-readable module stored in a computer memory executed by said data-processing apparatus, said module and said data-processing apparatus being operable in combination with one another to:
    select for product visualization a product description from a library of product descriptions;
    use a product visualizer o display the product defined by the selected product description;
    gather additional product information further defining a product type of the visualized product from a graphical user interface; and
    map the visualized product description and gathered additional product type information into a product type abstraction of a classification system for transforming product descriptions into process networks.

2. The system of claim 1, wherein said product descriptions comprise print product descriptions comprising a plurality of characteristics that describe said product type.

3. The system of claim 1, wherein said additional product type information comprises one or more terms for the visualized product applied via said graphical user interface.

4. The system of claim 1, wherein said automated system is configured to gather additional product information from said graphical user interface, said additional information comprising an entered range of at least one product characteristic comprising a range of total reader pages applying to a term for the visualized product.

5. The system of claim 4, wherein said automated system is configured to gather lower and upper bounds for the at least one product characteristic comprising an upper and lower bound of total reader pages; said lower and upper bounds being specified via said graphical user interface.

6. The system of claim 1, wherein said automated system is configured to generate a custom product type visualization using a product visualizer; said custom product type visualization being specified via said graphical user interface.

7. The system of claim 6 wherein said automated system is configured to export said generated custom product visualization as a product description.

8. The system of claim 1, wherein said automated system is configured to select for visualization a product description from said library of product descriptions using a query mechanism, to search and/or visualize product descriptions according to information entered via said graphical user interface; said query mechanism being configured to query a knowledge-base so as to filter on values of product type characteristics.

9. A method of knowledge gathering for transforming product descriptions into process networks; the method comprising
    providing a library of product descriptions;
    selecting for product visualization a product description from said library of product descriptions;
    using a product visualizer to display the product defined by the selected product description;
    gathering additional product information further defining a product type of the visualized product from a graphical user interface; and
    mapping the visualized product description and gathered additional product type information into a product type abstraction of a classification system.

10. The method of claim 9, wherein gathering additional product type information further defining the visualized product comprises gathering additional product type information provided via a graphical user interface.

11. The method of claim 10, wherein said product descriptions comprise print product descriptions comprising a plurality of characteristics that describe said product type.

12. The method of claim 10, wherein gathering additional product type, information further defining the visualized product comprises applying one or more terms for the visualized product.

13. The method of claim 10, wherein gathering additional product information further defining the visualized product comprises gathering a range of at least one product characteristic comprising a range of total reader pages applying to a term for the visualized product.

14. The method of claim 10, wherein gathering additional product information further defining the visualized product further comprises specifying lower and upper bounds comprising an upper and lower bound of total reader pages for the at least one product characteristic.

15. The method of claim 10, further comprising generating a custom product type visualization using a product visualizer; and exporting said generated custom product type visualization as a product description.

16. The method of claim 9, further comprising sharing an internal representation of the classification among a plurality of shops subsequent to said mapping of the visualized product description and gathered additional product information into the product type abstraction of the classification system.

17. The method of claim 9, wherein selecting for product visualization a product description from said library of product descriptions includes searching and/or visualizing via said graphical user interface product descriptions for selection.

18. A computer program product comprising:
    a computer-usable non-transitory instruction media that, when executed by a computer, cause the computer to perform a method comprising a method of knowledge gathering for transforming product descriptions into process networks; the method comprising
    providing a library of product descriptions;
    selecting for product visualization a product description from said library of product descriptions;
    using a product visualizer to display the product defined by the selected product description;
    gathering additional product information further defining a product type of the visualized product; and mapping the visualized product description and gathered additional product type information into a product type abstraction of a classification system.

19. The computer program product of claim 18, wherein gathering additionl product type information further defining the visualized product comprises gathering additional product type information provided via a graphical user interface.

20. The computer program product of claim 18, wherein said product descriptions comprise print product descriptions comprisinq a plurality of characteristics that describe said product type.

\* \* \* \* \*